United States Patent
Moran et al.

(10) Patent No.: US 6,183,804 B1
(45) Date of Patent: Feb. 6, 2001

(54) CONTINUOUS ON-DEMAND MANUFACTURE OF PROCESS CHEESE

(75) Inventors: James W. Moran, Antioch, IL (US); Hugh A. Dever, Glendale, FL (US); Anthony M. Miller, Northbrook, IL (US); Richard S. Silver, Wilmette; Michael A. Hyde, Wheeling, both of IL (US)

(73) Assignee: Kraft Foods, Inc., Northfield, IL (US)

( * ) Notice: Under 35 U.S.C. 154(b), the term of this patent shall be extended for 0 days.

(21) Appl. No.: 09/427,496

(22) Filed: Oct. 26, 1999

Related U.S. Application Data (60) Provisional application No. 60/105,832, filed on Oct. 27, 1998.

(51) Int. Cl.[7] .................................................. A23C 19/00
(52) U.S. Cl. .......................... 426/582; 426/478; 426/490; 426/491
(58) Field of Search .............................. 426/36, 39, 580, 426/582, 478, 490, 491, 656, 657

(56) References Cited

U.S. PATENT DOCUMENTS

| | | | |
|---|---|---|---|
| 4,271,201 | 6/1981 | Stenne | 426/40 |
| 4,401,679 | 8/1983 | Rubin et al. | 426/36 |
| 4,497,837 | 2/1985 | Barta | 426/42 |
| 4,820,530 * | 4/1989 | Moran et al. | 426/491 X |
| 4,948,599 | 8/1990 | Sagara et al. | 426/40 |
| 5,037,659 * | 8/1991 | Trecker et al. | 426/40 |
| 5,165,945 | 11/1992 | Yee et al. | 426/36 |
| 5,213,827 * | 5/1993 | Nauth et al. | 426/36 |
| 5,262,183 | 11/1993 | Moran et al. | 426/40 |
| 5,330,773 | 7/1994 | Piliero et al. | 426/36 |
| 5,334,398 * | 8/1994 | Sueyasu et al. | 426/36 |
| 5,356,639 | 10/1994 | Jameson et al. | 426/40 |
| 5,356,640 | 10/1994 | Jameson et al. | 426/40 |
| 5,378,479 * | 1/1995 | Trecker et al. | 426/42 |
| 5,554,397 | 9/1996 | Tanaka et al. | 426/36 |
| 6,093,424 * | 7/2000 | Han et al. | 426/42 |

FOREIGN PATENT DOCUMENTS

| | | | |
|---|---|---|---|
| 0755630 | * | 1/1997 | (EP) . |
| 00/27214 | * | 5/2000 | (WO) . |

* cited by examiner

Primary Examiner—Milton Cano
(74) Attorney, Agent, or Firm—Fitch, Even, Tabin & Flannery (57) ABSTRACT

A two stage, on-demand, commercially-viable method for producing process cheese or process cheese-type products by the direct conversion of milk is provided. This method does not require fermentation, enzymatic treatment, and/or intermediate steps of forming and separating curds and whey. In the first stage, a powdered milk protein concentrate is form by ultrafiltering liquid milk, preferably skim milk, and then spray drying the concentrated ultrafiltered milk. The powdered milk protein concentrate, which is storage-stable, may be converted to process cheese or process cheese-type product immediately or may be stored for later conversion. The powdered milk protein concentrate can be used to produce fat-free, reduced-or low-fat, and/or full-fat cheeses having similar organoleptic properties to cheeses prepared from conventional curds and whey processes. The present two stage process is especially adapted for semi-continuous or continuous manufacture of process cheese-type products. The present two stage process is especially adapted for on-demand manufacture of process cheese or process cheese-type product since the milk protein concentrate can be stored for later conversion to cheese product. By converting the milk to a storage-stable milk protein concentrate, the manufacturing of cheese products is uncoupled from, and is independent of, the milk supply.

15 Claims, 3 Drawing Sheets

CONTINUOUS ON-DEMAND MANUFACTURE OF PROCESS CHEESE

RELATED APPLICATIONS

This application is based on, and claims benefit of U.S. Provisional Patent Application Ser. No. 60/105,832 filed on Oct. 27, 1998.

FIELD OF THE INVENTION

The present invention relates to an "on-demand" method for producing process cheese or process cheese-type products by the direct conversion of milk. More particularly, the present invention provides a direct, fast, and on-demand method for producing process cheese or process cheese-type products directly from milk without fermentation, enzymatic treatment, and/or intermediate steps of forming and separating curds and whey. The present invention forms an intermediate milk protein concentrate in powdered form. The milk protein concentrate can be converted to a process cheese or process cheese-type product immediately or can be stored for later conversion. The present process can be used to produce fat-free, reduced-or low-fat, and/or full-fat cheeses having similar organoleptic properties to cheeses prepared from conventional curds and whey processes The present process is especially adapted for semi-continuous or continuous manufacture of process cheese-type products. The present process is especially adapted for on-demand manufacture of process cheese or process cheese-type product since the milk protein concentrate can be stored for later conversion to cheese product.

BACKGROUND OF THE INVENTION

Cheese is generally made by developing acidity in milk and setting the milk with a clotting agent, such as rennet, or by developing acidity to the isoelectric point of the protein. The set milk is cut and whey is separated from the resulting curd. The curd may be pressed to provide a cheese block. The whey, which contains significant amounts of whey protein, is generally further processed for protein and fat recovery. Curing typically takes place over a lengthy period of time under controlled conditions. Process cheese-type products can be prepared from such conventional cheeses by grinding and then heating the ground cheeses with emulsifying salt or salts in, for example, a laydown cooker.

The name or label given to the resulting product depends upon the ingredients used, its composition, and, in some instances, regulations promulgated by the U.S. Food and Drug Administration 21 C.F.R. §§133.169–180. For example, the term "pasteurized process cheese" refers to a product comprising a blend of cheeses to which an emulsifying agent, usually an emulsifying salt, and possibly acids, have been added, and which has then been worked and heated into a homogeneous plastic mass.

The term "pasteurized process cheese food" refers to a product which is prepared from the same materials and the same processes used for manufacture of process cheese. However, cheese food generally has added dairy ingredients such as cream, milk, skimmed milk, whey, or any of these from which part of the water has been removed (e.g., concentrated skimmed milk). The moisture level in process cheese food is generally higher than that of process cheese and may be up to about 44%. Fat is generally present at a level of not less than 23%. The term "pasteurized process cheese spread" refers to a product which is similar to cheese food, in the sense that it can contain the indicated dairy ingredients. Process cheese spread, however, may have a moisture level as high as 60%, and a minimum fat level of 20%. Process cheese, process cheese food, and process cheese spread are generally referred to as "standardized products", since their methods of manufacture and composition are determined by Federal Standards of Identity.

As used herein, the term "process cheese-type products" includes those products known and referred to as "pasteurized process cheese," "pasteurized process cheese food," "pasteurized process cheese spread," and "pasteurized process cheese product." "Process cheese-type products" also includes products resembling process cheese, process cheese food, process cheese spread, and process cheese product, regardless of whether or not they meet the U.S. Federal Standards of Identity for any of the above products in that they may contain ingredients not specified by such Standards, such as vegetable oil or vegetable protein, or may not meet the compositional requirements of such Standards. Process cheese-type products also include products having flavor and texture similar to those of a process cheese product regardless of the ingredients or manufacturing steps employed, and regardless of whether the Standards have been met.

There have been many efforts to provide simplified processes for making cheese or cheese-type products. U.S. Pat. No. 4,268,528 (May 19, 1981) provides a method for producing soft cheeses wherein milk is acidified to a pH less than 4.4 to coagulate the milk followed by ultrafiltration to produce a flowable acidified retentate containing flocculated casein. After cooling, the acidified retentate is stirred, taking care to avoid foaming, to deflocculate the flocculated casein after which rennet is added to form the cheese.

U.S. Pat. No. 4,271,201 (Jun. 2, 1981) provides a method whereby denatured whey protein is mixed with milk either before or after ultrafilitration. The resulting ultrafiltered milk is then coagulated using a lactic starter and then drained to produce a curd containing substantially the same amount of total serum protein as the original milk.

U.S. Pat. No. 4,401,679 (Aug. 30, 1983) provides a method for preparing a cheese base wherein milk is treated with ultrafiltration combined with diafiltration and evaporation. The ultrafiltered milk is innocualted with an acid culture before evaporation and acidified after evaporation to form the cheese base.

U.S. Pat. No. 4,948,599 (Aug. 14, 1990) provides a method for the continuous production of cheese using ultrafiltration. The ultrafiltered milk is cooled and acidified to a pH of 4.8 to 5.8 without coagulation. A milk coagulating enzyme or a lactic acid starter is then added and the mixture quickly heated to 25 to 84° C. to form cheese curds.

U.S. Pat. No. 4,497,834 (Feb. 5, 1985) provides a simplified method of making a dairy-based food product wherein milk is first condensed to the proportion of milk solids and moisture corresponding substantially to that desired in the final product after which the concentration of lactose in the milk is reduced by hydrolysis, molecular sieving, or ultrafiltration to below about 15 percent by weight at which crystallization was reported to occur. The mixture is then gelled by heating and thereafter cooled, manipulated, and packaged using conventional techniques.

U.S. Pat. No. 5,165,945 (Nov. 24, 1992) and U.S. Pat. No. 5,330,780 (Jul. 24, 1994) describe a process for producing cheese containing whey protein. Ultrafiltered and diafiltrated milk is rennetted and then heated to coagulate the mixture and deactivate the rennet. Water is then removed without removing soluble proteins to produce a cheese which contains casein and substantially all of the soluble protein in the original feed stock.

U.S. Pat. No. 5,330,773 (Jul. 19, 1994) provides a method for producing a low-fat cheese food product wherein a gelatin or gum is added to low-fat ultrafiltrated milk. The resulting milk blend is maintaining at a temperature such that gelling does not occur. After adding an activator such as lactic acid to form a paste, it is subjected to draining, brining, and ripening to form the low-fat cheese food product.

U.S. Pat. No. 5,262,183 (Nov. 16, 1993) provides a method in which a milk retentate is fermentated to a pH of about 4.8 to about 5.6 without coagulation. After adding a milk clotting enzyme in a non-coagulating amount, water is removed by evaporation to obtain a solids content of about 55 percent or higher to produce a pre-cheese. The pre-cheese is cured (generally over a three to fourteen day period) to convert at least 65 percent of kappa casein to para kappa casein.

U.S. Pat. No. 5,356,639 (Oct. 18, 1994) and U.S. Pat. No. 5,356,640 (Oct. 18, 1994) provide a method for producing cheese containing substantially all of the casein and whey protein in the starting milk using ultrafilration and diafiltration. The retentate is treated with salt to an ionic strength which prevents coagulation during fermentation and then fermented. Water is then removed the fermented concentrate by evaporation to obtain the cheese.

U.S. Pat. No. 5,554,397 (Sep. 10, 1996) provides a method for producing a cheese-type food from powdered milk. The powdered milk is produced from liquid milk by ultrafiltration, adjusting the pH of the ultrafiltered milk to 5.0 to 5.8, and then spray dried. The spray dried powdered milk, emulsifying salts, and water are heated to form a liquid mixture which is then cooled to obtain the cheese-type food.

In spite of the numerous attempts and the clear advantages such simplified processes would provide, they have generally not been commercially successful and, thus, the conventional cheese-making process remains, even with its significant drawbacks, the process of choice.

It would be desirable to provide a commercially-viable method for producing a cheese product which does not involve a whey drainage step and which can be accomplished in a short period of time. It would also be desirable to provide a commercially-viable, semi-continuous or continuous method for producing a cheese product directly from milk. It would also be desirable to provide a commercially-viable process by which milk can be converted into a storage-stable product (i.e., milk protein concentrate) which can be converted to a cheese product at a later time depending on the demand and need for the cheese product. It would also be desirable to provide a commercially-viable process whereby such storage-stable milk protein concentrate could be used to make a wide variety of cheese products including, but not limited to, full-fat, reduced-fat, and fat-free cheese products. The present specification provides such commercially-viable methods.

SUMMARY OF THE INVENTION

The present invention is directed to an "on-demand" process for producing a cheese product directly from milk in a short period of time. In the method, pasteurized milk, preferably skim milk, is subjected to ultrafiltration (UF), and optionally diafiltration (DF), to reduce the lactose and water content in the resulting ultrafiltered product. Preferably, both ultrafiltration and diafiltration are used in combination. The treated milk is then spray dried to form a storage-stable milk protein concentrate. The powdered milk protein concentrate can be directly converted to process cheese or stored for later conversion to process cheese. Thus, the manufacture of process cheese is uncoupled from, or independent of, the supply of milk, thereby allowing for on-demand manufacture of a wide variety of cheese products. For conversion to a process cheese or process cheese-type product, the milk protein concentrate is reconstituted with water. Fat is then added to the desired level (i.e., the level required in the final fat-free, reduced-fat, or full-fat product) followed by homogenization. Lactic acid can be added before or after homogenization at the desired level (i.e., the level to produce a pH of about 4.8 to about 5.5 in the fresh cheese). The resulting homogenized fresh cheese is then blended with other ingredients (e.g., flavorants, stabilizers, and the like) and then cooked in a conventional cheese processing unit such as, for example, a laydown cooker with the appropriate emulsifying salts to form the desired process cheese or process cheese-type product. The resulting process cheese or process cheese-type product is ready for immediate packaging and does not require a separate curing step. The process cheese or process cheese-type product is similar in flavor and texture characteristics to conventional process cheese.

The current method essentially has two major steps or stages: (1) formation of the powdered milk protein concentrate and (2) conversion of the powdered milk protein concentrate to the desired cheese product. The milk protein concentrate, especially milk protein concentrate prepared from skim milk, is storage-stable and can, therefore, be stored for later conversion to cheese product. For purposes of this invention, the term "storage-stable" is intended to mean that the powdered milk protein concentrate can be stored for at least 15 months at room temperature in a closed system without significant degradation (as measured by the ability to be converted to process cheese-type products in the second stage of this process). Storage at reduced temperatures and/or under an inert atmosphere will, of course, increase stability and allow even longer storage times. By using two stages, the present process effectively allows for uncoupling the milk supply and cheese production. When milk supply is high, milk can be converted to milk protein concentrate and stored until needed based on market conditions (i.e., rising demand and/or falling supply of various types of cheeses). Preferably the milk protein concentrate is derived from skim milk since such milk protein concentrate has better storage properties. The milk protein concentrate is converted to a given type of cheese product only when required. For purposes of this invention, the term "on-demand" is intended to mean that both the timing of cheese manufacture and the type of cheese manufactured can be controlled by the manufacture based on real-time market conditions. The current method, and each of the separate major steps or stages, can be employed as batch, semi-continuous, or continuous processes. When operated as a batch process, the approximate time from milk protein concentrate to process cheese product is on the order of about 2 hours. The present process, and each of the separate major steps, is readily adapted to semi-continuous or continuous operation. The present method, using milk protein concentrate from skim milk, can be used to produce fat-free, reduced-fat, and full-fat cheeses by adding the appropriate amount of fat during the conversion to process cheese products.

The present invention offers several significant advantages over the conventional cheese-making process. For example, the present invention allows the milk supply to be uncoupled from the actual cheese manufacturing process. In other words, milk can be converted to a storage-stable milk protein concentrate when milk is in plentiful supply and then stored until needed. In addition, the present invention provides a very efficient and rapid process which is readily adapted to semi-continuous or continuous operation. Moreover, the present invention provides a method of cheese-making which has, as compared to conventional cheese-making process, lower labor costs, limited capital expenditures, reduced transportation requirements, and lower inventory cost. If desired, the present process (or just the step of forming the milk protein concentrate) could be centrally located with regard to the supplying dairy herds, thereby further reducing transportation costs. In addition, the present process requires no separate grinding step or curing step. The present process allows also for more uniform process cheese or process cheese-type products since additives are used to adjust the flavor. Finally, the present process is especially adaptable to a closed system thereby significantly reducing the number of possible points of contamination (especially from airborne contamination).

One object of this invention is to provide a method for producing a process cheese-type product directly from milk wherein the process cheese-type product has a predetermined level of fat, said method comprising a first stage and a second stage, wherein the first stage comprises:

(a) reducing the lactose content of the milk to about 2.5 to about 4.0 percent and increasing the solids content to about 15 to about 50 percent using ultrafiltration; and (b) spray drying the product of step (a) at an elevated temperature to form a powdered milk protein concentrate which is storage-stable; and wherein the second stage comprises:

(A) hydrating the powdered milk protein concentrate from the first stage by mixing the powdered milk protein concentrate with water at a temperature of about 35 to about 160° F. to form a hydrated milk protein mixture;

(B) adjusting the fat content of the process cheese-type product to the predetermined level by adding fat to the hydrated milk protein mixture at a temperature of about 90 to about 160° F. and adjusting the pH of the hydrated milk protein mixture to about 4.8 to about 5.5 by adding an edible acid;

(C) treating the hydrated milk protein mixture from step (B) with shear to form fresh cheese;

(D) blending flavor additives with the fresh cheese;

(E) blending emulsifiers with the flavored fresh cheese at a temperature of about 150 to about 250° F. for a time sufficient to obtain the homogenous process cheese-type product having the predetermined level of fat;

wherein enzymes, enzyme cultures, or microorganisms are not employed and wherein there is no formation or separation of curds and whey.

Another object of this invention is to provide a process cheese-type product prepared directly from milk and having a predetermined level of fat, said process cheese-type product being prepared by a method comprising a first stage and a second stage, wherein the first stage comprises:

(a) reducing the lactose content of the milk to about 2.5 to about 4.0 percent and increasing the solids content to about 15 to about 50 percent using ultrafiltration; and (b) spray drying the product of step (a) at an elevated temperature to form a powdered milk protein concentrate which is storage-stable; and wherein the second stage comprises;

(A) hydrating the powdered milk protein concentrate from the first stage by mixing the powdered milk protein concentrate with water at a temperature of about 35 to about 160° F. to form a hydrated milk protein mixture;

(B) adjusting the fat content of the process cheese-type product to the predetermined level by adding fat to the hydrated milk protein mixture at a temperature of about 90 to about 160° F. and adjusting the pH of the hydrated milk protein mixture to about 4.8 to about 5.5 by adding an edible acid;

(C) treating the hydrated milk protein mixture from step (B) with shear to form fresh cheese;

(D) blending flavor additives with the fresh cheese;

(E) blending emulsifiers with the flavored fresh cheese at a temperature of about 150 to about 250° F. for a time sufficient to obtain the homogenous process cheese-type product having the predetermined level of fat;

wherein enzymes, enzyme cultures, or microorganisms are not employed and wherein there is no formation or separation of curds and whey.

Another object of this invention is to provide a method for producing a process cheese-type product directly from milk wherein the process cheese-type product has a predetermined level of fat, said method comprising a first stage and a second stage, wherein the first stage comprises:

(a) reducing the lactose content of the milk to about 0.5 to about 2.5 percent and increasing the solids content to about 15 to about 50 percent using ultrafiltration and diafiltration; and (b) spray drying the product of step (a) at an elevated temperature to form a powdered milk protein concentrate which is storage-stable; and wherein the second stage comprises;

(A) hydrating the powdered milk protein concentrate from the first stage by mixing the powdered milk protein concentrate with water at a temperature of about 35 to about 160° F. to form a hydrated milk protein mixture;

(B) adjusting the fat content of the process cheese-type product to the predetermined level by adding fat to the hydrated milk protein mixture at a temperature of about 90 to about 160° F. and adjusting the pH of the hydrated milk protein mixture to about 4.8 to about 5.5 by adding an edible acid;

(C) treating the hydrated milk protein mixture from step (B) with shear to form fresh cheese;

(D) blending flavor additives with the fresh cheese;

(E) blending emulsifiers with the flavored fresh cheese at a temperature of about 150 to about 250° F. for a time sufficient to obtain the homogenous process cheese-type product having the predetermined level of fat;

wherein enzymes, enzyme cultures, or microorganisms are not employed and wherein there is no formation or separation of curds and whey.

Still another object of this invention is to provide a process cheese-type product prepared directly from milk and having a predetermined level of fat, said process cheese-type product being prepared by a method comprising a first stage and a second stage, wherein the first stage comprises:

(a) reducing the lactose content of the milk to about 0.5 to about 2.5 percent and increasing the solids content to about 15 to about 50 percent using ultrafiltration and diafiltration; and (b) spray drying the product of step (a) at an elevated temperature to form a powdered milk protein concentrate which is storage-stable; and wherein the second stage comprises;

(A) hydrating the powdered milk protein concentrate from the first stage by mixing the powdered milk protein concentrate with water at a temperature of about 35 to about 160° F. to form a hydrated milk protein mixture;

(B) adjusting the fat content of the process cheese-type product to the predetermined level by adding fat to the hydrated milk protein mixture at a temperature of about 90 to about 160° F. and adjusting the pH of the hydrated milk protein mixture to about 4.8 to about 5.5 by adding an edible acid;

(C) treating the hydrated milk protein mixture from step (B) with shear to form fresh cheese;

(D) blending flavor additives with the fresh cheese;

(E) blending emulsifiers with the flavored fresh cheese at a temperature of about 150 to about 250° F. for a time sufficient to obtain the homogenous process cheese-type product having the predetermined level of fat;

wherein enzymes, enzyme cultures, or microorganisms are not employed and wherein there is no formation or separation of curds and whey.

These and other objects and advantages of the present invention will be apparent from a consideration of the present specification, including the claims and figures.

DETAILED DESCRIPTION OF THE INVENTION

The present invention provides a process for the direct and rapid conversion of milk—including full-fat, reduced-fat, and skim milk—to process cheese or process cheese-type products. The process described herein does not require conventional enzymes and/or cultures and/or microorganisms. Moreover the process does not require the formation of curds and whey nor, of course, the separation of curds and whey. (During the acidification step of the second stage, there may be a temporary occurrence or formation of curds and whey which, upon further processing, disappears. This temporary formation of curds and whey is not considered, within the context of this invention, to involve "formation of curds and whey" as used in the specification and claims.)

The present invention is essentially a two stage process. In the first stage, liquid milk (preferably liquid skim milk) is ultrafiltered and then spray dried to produce a storage-stable, powdered milk protein concentrate. This milk protein concentrate can be immediately converted to process cheese in the second stage or stored for later conversion to process cheese in the second stage. The second stage involves first hydrating the milk protein concentrate and acidifying the hydrated milk protein concentrate. (As noted above, during this acidification step, there may be a temporary occurrence or formation of curds and whey which, upon further processing, disappears. This temporary formation of curds and whey is not considered, within the context of this invention, to involve "formation of curds and whey" as used in the specification and claims.) Fat can then be added to the hydrated milk protein concentrate either before, during, or after acid addition to adjust the fat content of the final process cheese product to the desired level. Of course, no fat would be added in preparing a fat-free process cheese. The acidified hydrated milk protein concentrate (with or without added fat) is then subject to shear to form a homogenous mixture. Flavors and other additives are then added. Finally the mixture is then treated using conventional processing equipment (e.g., laydown cooker), during which time various flavorants, colorants, stabilizers, emulsifiers, and the like can be added, to form the desired process cheese or process cheese-type products. The process cheese or process cheese-type products obtained have similar flavor, texture, mouthfeel, and meltability of conventionally process cheeses prepared using the curd and whey technique. Since the conventional curd and whey separation is not employed in the present invention, the whey proteins normally contained in the separated whey are retained in the process cheese or process cheese-type product, thereby producing a more nutritious food product.

Since the milk protein concentrate can be stored until needed, the process allows for on-demand cheese manufacturing. This represents a significant improvement over conventional cheese manufacturing procedures where any milk must be converted to cheese products within a few days. The present invention allows the milk to be converted to a storage-stable milk protein concentration which can be stored for periods of up to about 15 months (or even longer). This stored milk protein concentrate can be converted to various types of process cheeses (including, but not limited to, full-fat, reduced-fat, low-fat, and fat-free cheeses) when needed. A manufacturer can, therefor, tailor both the type of cheese product and the timing of its manufacture to current or projected market conditions.

Figure 1:
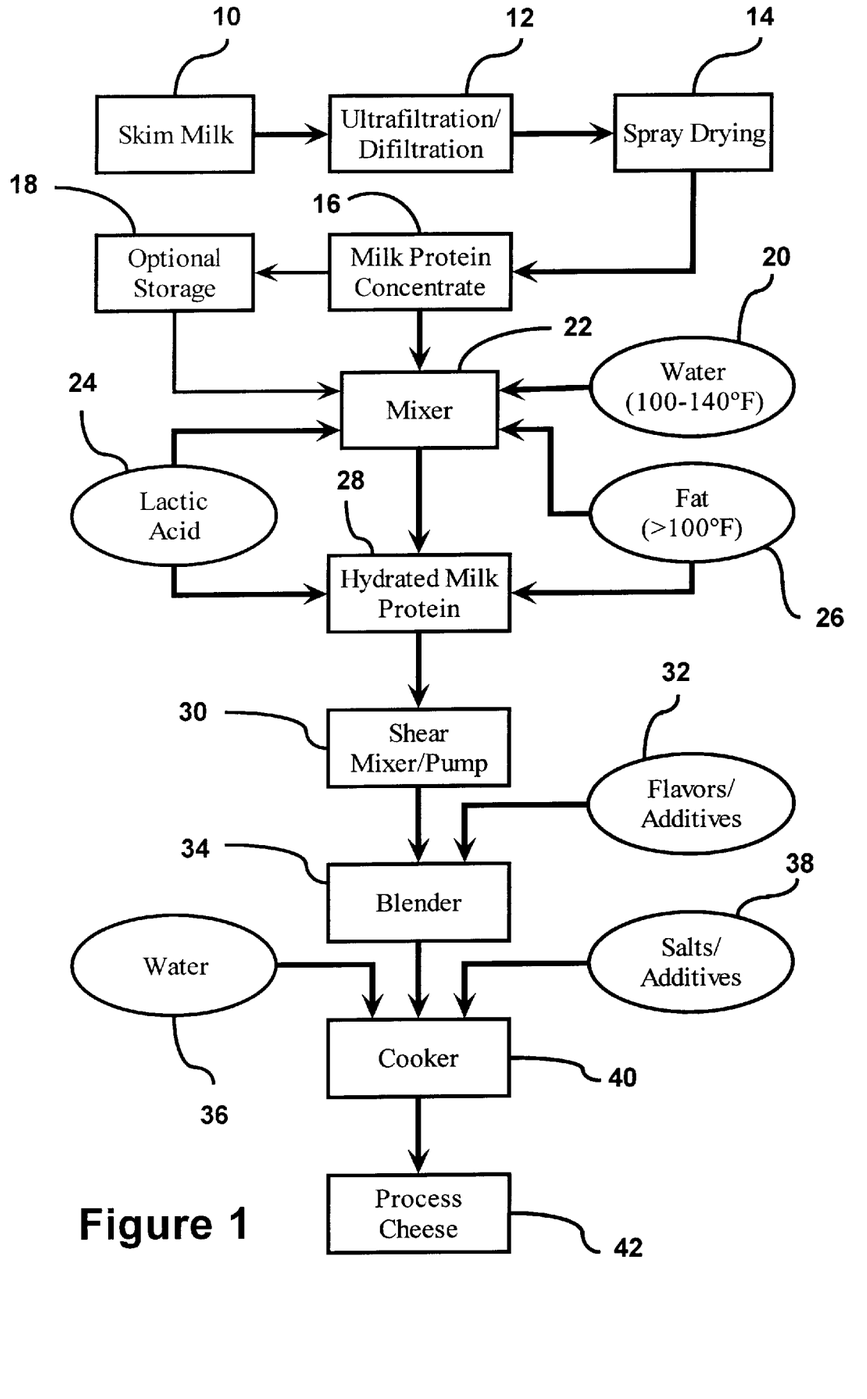
FIG. 1 is a flowchart illustrating one embodiment of the present invention.
Figure 2:
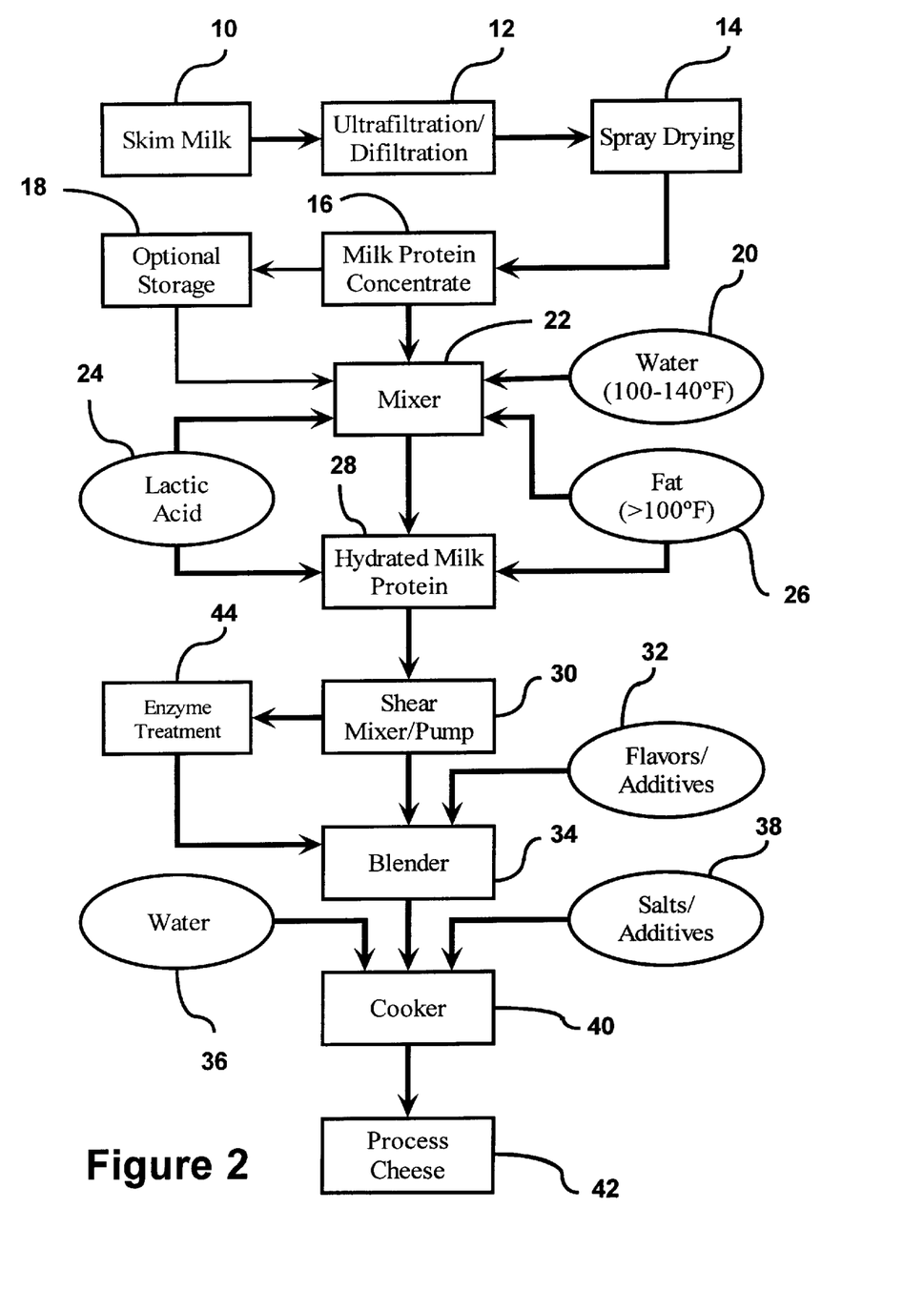
FIG. 2 is a flowchart illustrating another embodiment of the present invention.

The general process of the present invention is illustrated in FIGS. 1 and 2 using skim milk, preferably pasteurized, as the starting material. One preferred embodiment of the present invention, as shown in FIG. 1, begins with skim milk 10, preferably pasteurized skim milk, prepared by conventional methods. The liquid skim milk 10 is first concentrated by ultrafiltration 12 by a factor of about 1.3 to about 7, preferably by a factor of about 1.5 to about 6, and most preferably by a factor of about 4 to 6. The ultrafiltration step 12 reduces the water content to about 50 to about 85 percent and the lactose level to about 2.5 to about 4.0 percent. Although not shown in the figures, the lactose level could be reduced further (i.e., to a level of about 0.5 to about 2.5 percent), if desired, by using a combined ultrafiltration/difiltration step. Although not shown in the figures, an optional evaporation step could also be used to further reduce the water levels in the concentrated milk. The concentrated milk is then subjected to spray drying 14 to yield a powdered milk protein concentrate 16. The milk protein concentrate 16 can be stored in unit 18 for later conversion to cheese or immediately converted to cheese. The use of storage 18 allows conversion to cheese as dictated by market demands regarding cheese supplies rather than controlled by the milk supply. The formation of the milk protein concentrate 16, including optional storage 18, is considered to be stage 1.

Stage 2 involves the conversion of the milk protein concentrate 16 to process cheese 42. The milk protein concentrate 16, whether from storage 18 or directly from the spray drying unit, is first hydrated using water 20 (generally about 40 to about 150° F. and preferably about 90 to about 140° F.) using mixing unit 22 to obtain a homogenous mixture. Either during or after the mixing step, lactic acid 24 (or other edible acid) and fat 26 (if desired) is added to obtain the hydrated milk protein 28. Generally, fat 26 is at an elevated temperature (i.e., greater than or equal to about 100° F. and preferably about 110 to about 140° F.) when added. Suitable fats include cream, butter, plastic cream, anhydrous milkfat, vegetable oils, and the like. Although not shown in the figures, cream, if desired, can be added in place of, or with, water 20 in the hydration step. The use of cream would eliminate, or reduce, the addition of fat 26. The amount of added fat 26 (or cream) will, of course, depend on the desired fat content of the final process cheese product and will generally range from near zero for fat-free cheeses to about 35 percent for full-fat cheeses. Normally about 0.5 to about 2.0 percent of lactic acid 24 is added to obtain a pH value of about 4.8 to 5.5. It is generally preferred, but not required, that the fat 26 be added before the lactic acid 24. Salt can also be added with the lactic acid (or at a later stage of the process). Salt is generally added a level sufficient to obtain a final product 40 with a salt level of about 1.0 to about 2.0 percent for a loaf or sliced process cheese product and about 2.0 to about 4.0 percent for a cheese sauce-type product.

The hydrated milk protein 28 is preferably subjected to sufficient shear to yield a homogenous, relatively stable emulsion having a total solids content of about 20 to about 60 percent. The resulting product at this point in the process is referred to as "fresh cheese." The degree of shear required will depend on the composition of the hydrated milk protein. For example, if cream is used to hydrate the milk protein (with no other added fat) or if the hydrated milk protein does not contain any added fat, little shear (other than that normally associated with mixing) will be required (see, for example, Examples 2 and 3). Although not wishing to be limited by theory, the natural emulsifiers present in cream appear to be sufficient to provide stable emulsions without homogenization under high shear conditions. If the hydrated milk protein contains added fat (other than fat associated with cream), it will generally require high shear to form a stable emulsion (see, for example, Examples 1, 4, and 5). Preferably the fat-containing hydrated milk protein 28 is subjected to high shear to obtain a fresh cheese with a monodispersed fat particle size distribution (see, for example, FIG. 4). For purposes of this invention, "high shear" is intended to mean a sufficiently high shear to produce a stable, monodispersed fresh cheese. Typically, a high shear history greater than about 500 sec$^{-1}$ will be sufficient; preferably the high shear history is in the range of about 800 to about 1500 sec$^{-1}$. Preferably the mondispersed fresh cheese has a mean fat particle size of less than about 5 microns and, more preferably, in the range of about 1 to about 2 microns. Fresh cheeses having mondispersed fat particle size distribution and relatively small mean fat particle sizes generally are more stable than products produced with low shear. Fresh cheeses containing fat (other than fat associated with cream) which are prepared using low shear generally are coarse emulsions with polydispersed fat particle size distributions, fat particle sizes ranging from about 2 to greater than about 200 microns, and relatively high mean fat particle sizes (see, for example, FIG. 3). Fresh cheese having such larger fat droplets are generally less stable since the droplets can coalesce and form a separate fat layer. Of course, if the hydrated milk protein does not contain added fat or contains only fat associated with cream, stable emulsion can be prepared without high shear. Nonetheless, such hydrated milk protein can be treated with high shear if desired.

The proteins in the fresh cheese are in an intact and highly functional state with minimal whey protein to casein cross-linking. This fresh cheese has good texture-forming ability and good meltability. After forming a homogenous mixture in unit 30, flavors and other additives can be blended into the mixture in unit 34. After adding appropriate emulsifying salts and other additives 38 and water 36 to adjust the final moisture content of the process cheese, the mixture is then processed in a conventional cooker 40 (e.g., a laydown cooker operated at about 150 to 240° F.). As those skilled in the art will realize, the additions of flavors 32, salts 38, and water 36 can be made at the same time or at different times before the cooker 40. Using various flavorants, colorants, emulsifiers, stabilizers, and similar conventional additives, a process cheese or process cheese-type product 42 is obtained. The resulting process cheese or process cheese-type product can be packaged for retail sale or other use immediately. Curing, which results in a more homogeneous and favorable product, can take place during normal shipping periods (i.e., during the time the product is shipped to the retailer and stocked) under standard refrigeration conditions (i.e., about 35 to about 50° F.). Thus, a separate curing process, with its attendant presses, barrels, and the like, is not required.

Another preferred embodiment is illustrated in FIG. 2. The process shown therein differs from that in FIG. 1 mainly by the inclusion of a separate step 44 wherein a relatively small portion of the homogenous hydrated milk protein (fresh cheese) from unit 30 is diverted to an enzyme treatment step 44. Preferably the fresh cheese has been formed using high shear conditions such that the fat droplets are monodispersed with a mean fat particle size less than about 5 microns and more preferably in the range of about 1 to about 2 microns. Generally, the amount of fresh cheese diverted to the enzyme treatment step 44 is less than about 10 percent, and preferably less than about 5 percent of the total stream of fresh cheese entering unit 30. The diverted fresh cheese is treated with conventional enzymes, cultures, and/or microorganisms and then added back to the fresh cheese stream as a flavorant (i.e., enzyme-modified cheese). Fresh cheese having small droplets generally allow for enhanced enzymatic reactions by increasing the oil/water interfacial area available for reaction. Moreover, fresh cheese having small droplets decreases the likelihood that a fat layer will form; any such fat layer would be less likely to undergo the desired enzymatic reactions.

For purposes of this invention, the use of this alternative process with its enzymes, cultures, and/or microorganisms is not considered to be within the main process; in other words, the overall process is still considered to be free of, and/or not require, the use of enzymes, cultures, and/or microorganisms relative to a conventional cheese-making process. Although shown as being added to the blender 34, the treated fresh cheese 44 could be added at other locations in the stage 2 process (e.g., in the cooker 40). The addition of the treated fresh cheese 44 could reduce or eliminate the need for other flavor additives. Except for the enzyme treatment step 44, essentially the same steps are used as described above for FIG. 1.

The resulting process cheese or process cheese-type product 42 can range from a process cheese in sliced or loaf form to a cheese sauce type mainly depending on the water content which is largely controlled using the water addition steps 20 and 36. For a sliced or loaf process cheese-type product, the moisture content is about 35 to about 60 percent water, the protein content is about 10 to about 30 percent, and the salt content is about 1.5 to 2.5 percent. For a sauce process cheese type product, the moisture content is about 45 to about 80 percent water; the protein content is about 5 to about 25 percent, and the salt content is about 2.0 to 4.0 percent. The final adjustment of the water level can be made in step 36.

As illustrated in FIGS. 1 and 2, the present inventive processes have two basic steps or stages: (1) formation of a storage-stable milk protein concentrate and (2) conversion of the storage-stable milk protein concentrate to process cheese. Although the milk used can be whole, reduced-fat, or skim milk, it is generally preferred that skim milk be used. Skim milk is especially preferred when the milk protein concentrate is expected to be stored (unit 18) before conversion to cheese. Milk protein concentrate having significant levels of fat (e.g., concentrate prepared with whole milk) may undergo fat oxidation unless special packaging and storage conditions are used. Using skim milk essentially eliminates the potential fat oxidation problem. Using skim milk also allows the process to be modified as needed with regard to the type of cheese being prepared by simply adjusting the level of added fat. Preferably the skim milk is pasteurized using conventional methods; normally a temperature of about 160 to 180° F. for about 15 to about 30 seconds is sufficient. The milk is then ultrafiltered with or without diafiltration to reduce the moisture content to about 50 to about 85 percent and the lactose level to about 2.5 to about 4.0 percent with ultrafiltration alone and to about 0.5 to about 2.5 percent with ultrafiltration combined with diafiltration. Ultrafiltration (with or without diafiltration) is carried out using conventional and commercially available equipment at a temperature of about 100 to about 140° F. and a pressure of about 10 to about 40 psi to concentrate the milk by a factor of about 1.3 to about 7, preferably to about 1.5 to 6, and most preferably to about 4 to 6. The ultrafiltered milk is then spray dried at elevated temperatures using conventional spray drying techniques. Generally, the temperature of the ultrafiltered milk is at about 100 to about 180° F. during spray drying. Of course, the resulting powdered milk protein concentrate has higher lactose levels since a large proportion of the water is removed; generally the powdered milk protein concentrate will contain about 40 to about 85 percent protein and about 1 (or even less) to about 45 percent lactose. If desired, the calcium content of the milk protein concentrate can be adjusted (i.e., lowered) by acidification of the milk prior to ultrafiltration. In addition and if desired, sodium chloride can be added to the milk prior to ultrafiltration in order to lower the calcium content and increase the salt content of the milk protein concentrate. The resulting powdered milk protein concentrate can be stored for later conversion to process cheese. Thus, the present process effectively uncouples milk supply and cheese demand and manufacture. The conversion of the stored milk protein concentrate will be controlled only by cheese demand. Moreover, since fat is only added later, the type of cheese prepared from the milk protein concentrate can be determined by the demand for the various types of cheese at the time of the conversion. Thus, the cheese product mix (based on both fat content and cheese type criteria) is also uncoupled from the milk supply. Since the milk concentrate can be stored until needed and the fat content determined during to process of the second stage, the present invention provides for on-demand cheese manufacturing.

In the second stage of the process, the milk protein concentrate is first hydrated and then converted to process cheese. Water, preferably at about 90 to about 140° F., is used to form the hydrated milk protein concentrate with a solids content of about 20 to about 40 percent. The hydrated milk protein concentrate is then treated with a suitable edible acid (preferably lactic acid) to bring the pH to about 4.8 to about 5.5. If desired, salt can be added. Fat (at a temperature greater than about 100° F.) is also added (before, after, or at the same time as the acid addition) in an amount determined by the type of process cheese or process cheese-type product being produced. Generally, it is preferred that the fat be added before the pH is adjusted with lactic acid. Suitable fats include cream, butter, plastic cream, anhydrous milkfat, vegetable oils, and the like. The fresh cheese generally has a pH of about 4.8 to 5.5, a lactose level of about 0.5 to about 15.0 percent, solids content of about 20 to about 60 percent, and a protein content of about 10 to about 30 percent. The fat content will, of course, be determined from the type of cheese desired. After forming a homogenous mixture of the fresh cheese, various flavorants and other additives can be added before or during the final cheese processing or cooking step.

The fresh cheese is then processed to form a process cheese or process cheese-type product using conventional cheese processing techniques by blending the fresh cheese at elevated temperature with emulsifiers, flavorants, colorants, preservatives, and the like. Preferably the fresh cheese is converted to a process cheese or process cheese-type product in a conventional laydown cooker operated at about 150 to about 240° F., preferably at about 160 to about 200° F., using standard emulsifying salts. Suitable emulsifying salts include, for example, disodium phosphate, monosodium phosphate, dipotassium phosphate, trisodium phosphate, sodium metaphosphate, sodium tripolyphosphate, sodium acid pyrophosphate, tetrasodium phosphate, sodium aluminum phosphate, sodium hexametaphosphate, sodium citrate, potassium citrate, calcium citrate, sodium tartrate, and mixtures thereof. Preferred emulsifiers include disodium phosphate and sodium citrate. Other conventional additives—such as, for example, flavorants, colorants, stabilizers, preservatives, vitamins, protein additives, starches, and the like—can be added before or during this final processing step. Because flavor is controlled by flavor additives that are added or incorporated in the final processing steps, more consistent and controllable flavor can be obtained as compared to conventional cheese prepared using enzymes and/or microorganisms. Flavor additives can include, if desired, small amounts of highly flavored natural cheeses, enzyme- and/or microorganism-produced cheeses or, if desired and as shown in FIG. 2 (enzyme treatment step 44), enzyme- and/or microorganism-treated fresh cheese (i.e., enzyme-modified cheese). Such enzyme- and/or microorganism-produced cheeses or enzyme- and microorganism-treated fresh cheese, would only be added towards the end of the process; thus, for purposes of this invention, the process would still be considered to be free of such enzymes, enzyme cultures, and/or microorganisms.

The second stage process, starting with milk protein concentrate, can be completed in a period of only a few hours. Using a batch process, the time required from powdered milk protein concentrate to hydrated milk protein (from unit 16 to unit 28 in FIGS. 1 and 2) is about 0.5 hours; from hydrated milk protein to fresh cheese (from unit 28 to unit 34), it is about 0.5 hours; and from fresh cheese to process cheese-type product, it is about 3 hours; thus the total time from powdered milk protein concentrate milk to process cheese-type product is only about 4 hours. In commercial semi-continuous or continuous operations, the time from powdered milk protein to process cheese-type product is expected to be significantly shorter (e.g., about 2 total hours). Assuming a steady supply of powdered milk protein concentrate (either fresh or stockpiled), the present cheese-making process could easily operate on a continuous basis.

The resulting cheese can be packaged for retail sale or other use immediately after sufficiently cooling without the need for a separate curing step. Generally, however, some curing is desirable to fully develop the desired flavor and texture characteristics. This curing can take place at refrigeration temperatures in a relatively short time. Generally, sufficient curing will have taken place during the time the product is shipped and displayed on a retailer's shelf (i.e., about 1 to 2 weeks).

The following examples further illustrate various features of the invention but are not intended to limit the scope of the invention as set forth in the appended claims.

EXAMPLE 1

A dried skim milk protein concentrate (MPC) was obtained from New Zealand Milk Products, Inc. (Santa Rosa, Calif.). The MPC was prepared by ultrafiltration of pasteurized skim milk to produce an ultrafiltered product having about 4 percent lactose and about 25 percent solids. The ultrafiltered product was then spray dried to produce the solid, powdered MPC having about 68 percent protein, about 16 percent lactose, about 5.8 percent moisture, and about 1.1 percent fat. The MPC powder (42.9 lbs) was mixed with water (75 lbs) at 120° F. in a Semi-Bulk Vacucam (Semi-Bulk Systems, Inc., Fenton, Mo.) for about 5 minutes. The resulting hydrated milk protein was further mixed with melted anhydrous milkfat (55 lbs), salt (3.6 lbs), and 88 percent lactic acid (1.5 lbs). The resulting mixture was homogenized in a Dispax shear reactor (IKA Works, Inc., Wilmington, N.C.) with a shear history of about 512 sec$^{-1}$ at 120° F. The resulting fresh cheese contained about 43 percent moisture, about 17 percent protein, about 2.1 percent salt, and about 3.9 percent lactose and had a pH of about 5.3.

A pasteurized process cheese spread loaf was prepared by blending Cheddar cheese (added for flavor) and the fresh cheese (about 2 to 1 weight to ratio). Small amounts (generally less than about 10 percent each) of whey powder, and additional MPC; small amounts (generally less than about 0.5 percent) of sorbic acid and cheese color were also added. Emulsifiers (monosodium phosphate and disodium phosphate; less than about 3 percent total) were also added to the cheese mixture. The resulting cheese mixture was processed in a Damrow laydown direct steam injected cooker (Damrow Co., Inc., Fond du Lac, Wis.) at 175° F. The hot melted cheese was formed into 2 lb loaves and cooled in a forced air cooler to 40° F. The resulting pasteurized process cheese spread loaf had flavor, texture, and meltability similar to conventionally prepared cheese products.

EXAMPLE 2

Fresh cheese was prepared as in Example 1 except that fresh cream was used to hydrate the MPC and to replace the added fat. Using cream to form the hydrated milk protein allowed the high shear homogenization step to be omitted. The cream used had a composition of about 45 percent fat and about 51 percent moisture. The result fresh cheese composition was about 42 percent moisture, about 32 percent fat, about 16 percent protein, about 2.1 percent salt, and about 5.2 percent lactose with a pH of about 5.3. The fresh cheese was used essentially as described in Example 1 to prepare a pasteurized process cheese loaf except that the homogenization step was omitted. The resulting product had flavor, texture, and meltability similar to conventionally prepared cheese products.

EXAMPLE 3

A skim fresh cheese was produced in the same manner as described in Example 1 except that no fat was added and, thus, the homogenization step was not required. The resulting skim fresh cheese was about 64 percent moisture, about 0.4 percent fat, about 25 percent protein, about 0.6 percent salt, and about 5.7 percent lactose with a pH of about 5.3. The skim fresh cheese was used to replace about 50 percent of the conventionally made fat-free skim cheese in the production of fat-free pasteurized process cheese product slices. The resulting fat-free process cheese product slices had good flavor, texture, and meltability which was comparable to a conventional product prepared with only conventionally made fat-free skim cheese.

EXAMPLE 4

Fresh cheese was prepared as described in Example 1. A portion of the fresh cheese as treated with enzymes including a pregastric esterase (lipase), a fungal endoprotease, and a bacterial aminopeptidase. The resulting mixture was held at about 30° F. for four days to permit the enzymatic conversion and then heated to about 170° F. to deactivate the enzymes. A pasteurized process cheese loaf was prepared from a mixture of about 51 percent fresh cheese, about 14 percent conventional young (i.e., unaged) cheese, and about 5 percent of the enzyme-treated fresh cheese, using essentially the same procedure as in Example 1. The enzyme-treated fresh cheese was the only flavor source used. The resulting product had texture and meltability comparable to conventionally prepared cheese products; the flavor was comparable to conventionally prepared process cheese loaves containing up to about 20 percent aged cheddar cheese.

EXAMPLE 5

Several batches of fresh cheese were prepared as in Example 1 except that the hydrated milk protein (with added melted anhydrous milkfat, salt, and lactic acid) was subjected to various homogenization conditions. In each case, the fat droplet size distribution of the resulting fresh cheese emulsion was determined.

Figure 3:
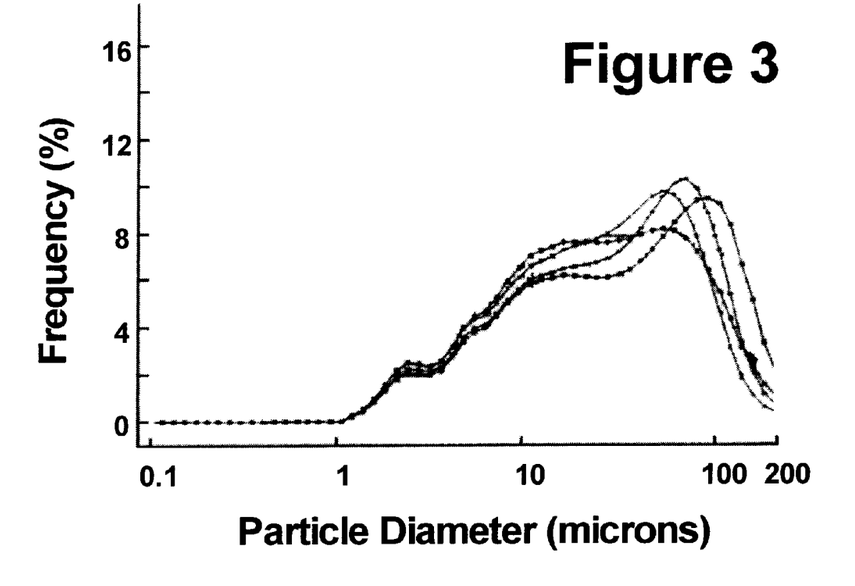
FIG. 3 illustrates the typical polydispersed fat particle size distribution when fat-containing fresh cheese is formed under low shear conditions.

Using low shear conditions (i.e., the fresh cheese emulsion was prepared in a Groen tank), the fat droplets displayed a broad and polydispersed fat particle size distribution. Fat particle sizes ranged from about 1 micron up to about 200 microns (and higher) with a mean fat particle size of about 40 microns. FIG. 3 illustrates a typical polydispersed fat particle size distribution obtained under low shear conditions for four samples. The resulting fresh cheese emulsion was not as stable as desired since the larger fat droplets tend to coalesce and rise to the surface as a fat layer.

Figure 4:
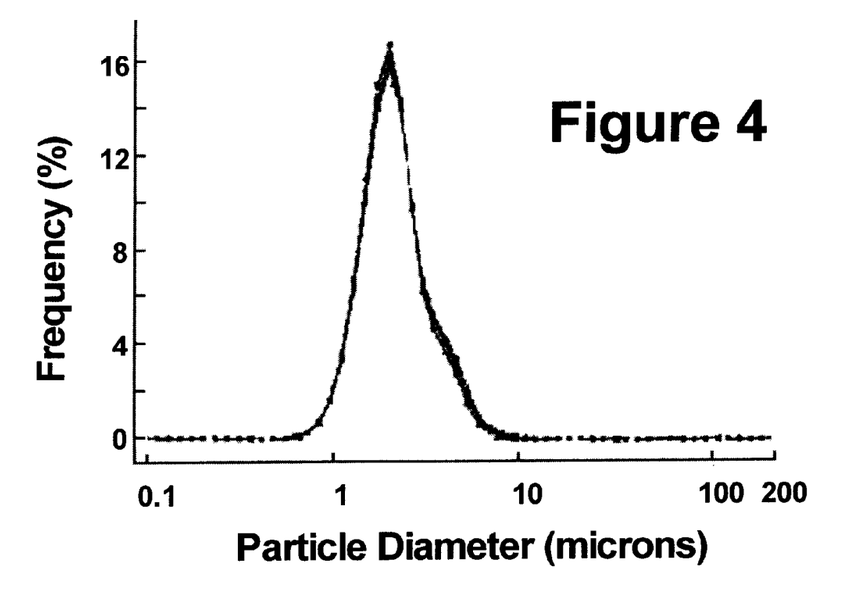
FIG. 4 illustrates the typical monodispersed fat particle size distribution when fat-containing fresh cheese is formed under high shear conditions.

FIG. 4 illustrates the monodispersed fat particle size distribution obtained using high shear homogenization. The fresh cheese was homogenized using a single pass through a Dispax shear reactor (IKA Works, Inc., Wilmington, N.C.). The fresh cheese at about 120° F. was pumped at a rate of about 29–30 pounds per minute with the pump operated at about 3600 rpm (shear history of about 900 sec$^{-1}$). A monodispersed fat particle size distribution was obtained with a mean fat particle size of about 1.9 microns.

Similar results were obtained using a Hydroshear emulsifier wherein the shear is created by line pressure to force the fluid through small diameter nozzles. A single pass through the Hydroshear device resulted in a monodispersed fat particle size distribution with a mean fat particle size of about 2.2 microns. Multiple passes through the Hydroshear emulsifier provided monodispersed distributions with mean fat particles sizes of about 1.1 microns (10 minute recycle through the emulsifier) and about 0.9 microns (20 minute recycle through the emulsifier). The fat particle size distribution curves were similar to the plot shown in FIG. 4.

The examples above demonstrate that for fat-containing hydrated milk protein samples (except where cream is used as the only source of added fat) higher shear conditions are required in order to obtain a stable fresh cheese. If, however, cream is used as the only source of added fat or if fat is not incorporated into the hydrated milk protein, high shear conditions are not required.

What is claimed is:

1. A method for producing a process cheese-type product directly from milk wherein the process cheese-type product has a predetermined level of fat, said method comprising a first stage and a second stage, wherein the first stage comprises:

(a) reducing the lactose content of the milk to about 2.5 to about 4.0 percent and increasing the solids content to about 15 to about 50 percent using ultrafiltration or reducing the lactose content of the milk to about 0.5 to about 2.5 percent and increasing the solids content to about 15 to about 50 percent using ultrafiltration with diafiltration; and (b) spray drying the product of step (a) at an elevated temperature to form a powdered milk protein concentrate which is storage-stable; and wherein the second stage comprises;

(A) hydrating the powdered milk protein concentrate from the first stage by mixing the powdered milk protein concentrate with water at a temperature of about 35 to about 150° F. to form a hydrated milk protein mixture;

(B) adjusting the pH of the hydrated milk protein mixture to about 4.8 to about 5.5 by adding an edible acid and adjusting the fat content of the process cheese-type product to the predetermined level by adding fat to the hydrated milk protein mixture at a temperature of about 100 to about 140° F.;

(C) treating the hydrated milk protein mixture from step (B) with shear to form fresh cheese;

(D) blending flavor additives with the fresh cheese;

(E) blending emulsifiers with the flavored fresh cheese at a temperature of about 150 to about 240° F. for a time sufficient to obtain the homogenous process cheese-type product having the predetermined level of fat;

wherein enzymes, enzyme cultures, or microorganisms are not employed and wherein there is no formation or separation of curds and whey.

2. The method as defined in claim 1, wherein the hydrated milk protein mixture from step (B) is treated with sufficient shear to form fresh cheese having a monodispersed fat particle size distribution and a mean fat particle size of less than about 5 microns.

3. The method as defined in claim 2, wherein the fresh cheese has a mean fat particle size of about 1 to about 2 microns.

4. The method as defined in claim 1, wherein the liquid milk is liquid skim milk.

5. The method as defined in claim 2, wherein the liquid milk is liquid skim milk.

6. The method as defined in claim 1, wherein the milk protein concentrate from stage 1 is stored until it is desired to produce the process cheese-type product in stage 2.

7. The method as defined in claim 2, wherein the milk protein concentrate from stage 1 is stored until it is desired to produce the process cheese-type product in stage 2.

8. The method as defined in claim 2, wherein steps (D) and (E) in the second stage are carried out at essentially the same time.

9. The method as defined in claim 5, wherein steps (D) and (E) in the second stage are carried out at essentially the same time.

10. The method as defined in claim 2, wherein stage 2 is operated in a semi-continuous or continuous manner.

11. The method as defined in claim 5, wherein stage 2 is operated in a semi-continuous or continuous manner.

12. The method as defined in claim 2, wherein the predetermined level of fat is such that the process cheese-type product is a fat-free or reduced-fat cheese product.

13. The method as defined in claim 5, wherein the predetermined level of fat is such that the process cheese-type product is a fat-free or reduced-fat cheese product.

14. The method as defined in claim 2, wherein at least a portion of the water in step (A) is replaced with cream, whereby the amount of fat added in step (B) is reduced or eliminated.

15. The method as defined in claim 5, wherein at least a portion of the water in step (A) is replaced with cream, whereby the amount of fat added in step (B) is reduced or eliminated.

* * * * *